United States Patent
Lee et al.

(10) Patent No.: US 9,936,155 B2
(45) Date of Patent: Apr. 3, 2018

(54) APPARATUS AND METHOD FOR CONFIGURING ACCESS IN A WIRELESS NETWORK

(71) Applicant: Samsung Electronics Co., Ltd., Gyeonggi-do (KR)

(72) Inventors: Kwang-Yong Lee, Seoul (KR); Kyong-Ha Park, Gyeonggi-do (KR); Hyun-Ki Jung, Seoul (KR); Hyun-Su Hong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 638 days.

(21) Appl. No.: 13/665,482

(22) Filed: Oct. 31, 2012

(65) Prior Publication Data

US 2013/0107806 A1    May 2, 2013

(30) Foreign Application Priority Data

Oct. 31, 2011 (KR) .................. 10-2011-0112234

(51) Int. Cl.
*H04N 5/44* (2011.01)
*H04W 48/14* (2009.01)
(Continued)

(52) U.S. Cl.
CPC ....... *H04N 5/4403* (2013.01); *H04N 21/4108* (2013.01); *H04N 21/41407* (2013.01); *H04N 21/42221* (2013.01); *H04N 21/4367* (2013.01); *H04N 21/43615* (2013.01); *H04N 21/43637* (2013.01); *H04N 21/658* (2013.01); *H04N 21/6547* (2013.01); *H04W 12/08* (2013.01); *H04W 48/14* (2013.01); *H04N 2005/4426* (2013.01); *H04W 4/008* (2013.01); *H04W 8/205* (2013.01); *H04W 84/12* (2013.01)

(58) Field of Classification Search
CPC .......... H04N 5/4403; H04N 21/42221; H04N 21/4108; H04N 21/41407; H04N 21/43615; H04N 21/43637; H04N 21/4367; H04N 21/6547; H04N 21/658; H04N 2005/4426; H04W 4/008; H04W 8/205; H04W 84/12; H04W 12/08; H04W 48/14

See application file for complete search history.

(56) References Cited

U.S. PATENT DOCUMENTS 8,761,665 B2   6/2014  Lee
8,792,429 B2   7/2014  Hassan et al.
(Continued)

FOREIGN PATENT DOCUMENTS

| JP | 2010-081613 A | 4/2010 |
| KR | 10-2010-0075580 A | 7/2010 |
| KR | 10-1036656 | 5/2011 |

OTHER PUBLICATIONS

U.S. Office Action issued for U.S. Appl. No. 14/880,952 dated Feb. 16, 2016, 8 pgs.

(Continued)

*Primary Examiner* — Ajay Cattungal

(57) ABSTRACT

According to one embodiment, a method for access configuration in a wireless network includes acquiring authentication information of a digital device and information needed to access an Access Point (AP) of the digital device, from a Radio Frequency IDentifier (RFID) tag, and accessing the AP.

18 Claims, 9 Drawing Sheets

(51) Int. Cl.
*H04N 21/422* (2011.01)
*H04W 12/08* (2009.01)
*H04N 21/41* (2011.01)
*H04N 21/414* (2011.01)
*H04N 21/436* (2011.01)
*H04N 21/4363* (2011.01)
*H04N 21/4367* (2011.01)
*H04N 21/6547* (2011.01)
*H04N 21/658* (2011.01)
*H04W 4/00* (2018.01)
*H04W 8/20* (2009.01)
*H04W 84/12* (2009.01)

(56) References Cited

U.S. PATENT DOCUMENTS

| | | | |
|---|---|---|---|
| 8,819,429 B2 | 8/2014 | Iwamura | |
| 2005/0079817 A1 | 4/2005 | Kotola et al. | |
| 2006/0101280 A1* | 5/2006 | Sakai | G06F 21/35 713/184 |
| 2007/0287498 A1* | 12/2007 | Wang | G06Q 10/087 455/556.1 |
| 2008/0060059 A1* | 3/2008 | Yoshida | G06F 21/31 726/4 |
| 2008/0120668 A1* | 5/2008 | Yau | H04N 5/44582 725/110 |
| 2009/0098825 A1* | 4/2009 | Huomo | G06Q 20/20 455/41.1 |
| 2009/0111378 A1 | 4/2009 | Sheynman et al. | |
| 2009/0128392 A1* | 5/2009 | Hardacker | H04L 63/0428 341/175 |
| 2010/0068997 A1 | 3/2010 | Dunko | |
| 2010/0313241 A1* | 12/2010 | Lee | G06F 15/16 726/3 |
| 2011/0022411 A1 | 1/2011 | Hjelm et al. | |
| 2012/0240158 A1* | 9/2012 | Pan | H04N 21/2668 725/34 |
| 2013/0152135 A1* | 6/2013 | Hong | H04N 21/4622 725/51 |

OTHER PUBLICATIONS

United States Office Action dated Jun. 14, 2016 in connection with U.S. Appl. No. 14/880,952, 9 pages.
United States Patent and Trademark Office, "Non-Final Office Action," U.S. Appl. No. 14/880,952, Dec. 1, 2016, 16 pages.
Notice of Preliminary Rejection dated Jun. 19, 2017 in connection with Korean Patent Application No. 10-2011-0112234.
USPTO, Notice of Allowance and Fee(s) Due, U.S. Appl. No. 14/880,952, dated Dec. 18, 2017, 8 pages.
Communication from a foreign patent office in a counterpart foreign application, Text of Notice of Patent Grant, Korean Application No. 10-2011-0112234, dated Nov. 27, 2017, 4 pages.

* cited by examiner

APPARATUS AND METHOD FOR CONFIGURING ACCESS IN A WIRELESS NETWORK

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Oct. 31, 2011 and assigned Serial No. 10-2011-0112234, the entire disclosure of which is hereby incorporated by reference.

TECHNICAL FIELD OF THE INVENTION

The present invention relates generally to a wireless network.

BACKGROUND OF THE INVENTION

Demand for services related to sharing media content between a smart phone and a digital device has increased due to the proliferation of smart digital devices, such as smart phones and smart televisions (TVs). To share the media content, communication between the smart phone and the digital device is usually provided through a wireless network, such as a wireless Local Area Network (LAN). Communication in this manner is typically provided via access over the wireless network through an Access Point (AP). Setup of the connection between the smart phone and the digital device, in many cases, can seem cumbersome and complicated to a general user.

AP setup and Wireless Fidelity (WiFi) setup used to establish the wireless LAN environment can be difficult for the general user. In the access configuration, a terminal such as smart phone activates a WiFi function and then searches for a nearby AP. Upon detecting the AP, the terminal accesses the AP using a Service Set IDentifier (SSID) of the AP. When the access to the AP requires a password the user needs to know and properly input the password.

In view of current technological trends seeking more intuitive and simplified interfaces, such an access configuration process may be cumbersome.

SUMMARY OF THE INVENTION

To address the above-discussed deficiencies of the prior art, it is a primary aspect of the present invention to provide an apparatus and a method for configuring access in a wireless network.

Another aspect of the present invention is to provide an apparatus and a method for configuring access without a user having to recognize an SSID and a password of an AP in a wireless network.

Yet another aspect of the present invention is to provide an apparatus and a method of a terminal for acquiring SSID and password information of an AP in a wireless network.

Still another aspect of the present invention is to provide an apparatus and a method of for providing SSID and password information of an AP to a terminal using Radio Frequency IDentifier (RFID) technology in a wireless network.

According to one aspect of the present invention, an operating method of a terminal for configuring access in a wireless network includes acquiring authentication information of a digital device and information needed to access an Access Point (AP) of the digital device, from an RFID tag, and accessing the AP.

According to another aspect of the present invention, an operating method of a digital device in a wireless network includes accessing a server, and registering authentication information of the digital device and information needed to access an AP with the server.

According to yet another aspect of the present invention, an operating method of a server for access configuration in a wireless network includes receiving information needed to access an AP, from a digital device, registering the information needed to access the AP, and providing the information needed to access the AP to the terminal when a terminal requests the information needed to access the AP.

According to still another aspect of the present invention, an apparatus of a terminal for configuring, access in a wireless network includes an RFID module for acquiring authentication information of a digital device and information needed to access an AP of the digital device, from an RFID tag; and a control unit for accessing the AP.

According to a further aspect of the present invention, an apparatus of a digital device in a wireless network includes a control unit configured to access a server and registering authentication information of the digital device and information needed to access an AP to the server, and the AP is configured to transmit the authentication information and the information needed to access the AP under control of the control unit.

According to a further aspect of the present invention, an apparatus of a server for access configuration in a wireless network includes a communication unit configured to receive information needed to access an AP, from a digital device, and a control unit configured to register the information needed to access the AP, and providing the information needed to access the AP to the terminal when a terminal requests the information needed to access the AP.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The following description with reference to the accompanying drawings is provided to assist in a comprehensive understanding of example embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following, description of example embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to an apparatus and a method for configuring access to an Access Point (AP) in a wireless network. Certain embodiments of the present invention provide a technique for configuring access between a terminal and an Access Point (AP) in a wireless network. Hereinafter, the terminal encompasses a cellular phone, a Personal Communication System (PCS), a Personal Digital Assistant (PDA), an International Mobile Telecommunication (IMT)-2000 terminal, a smart phone, a tablet Personal Computer (PC), a lap-top computer, and a desk-top computer, and represents any device including an interface for accessing the AP.

Figure 1:
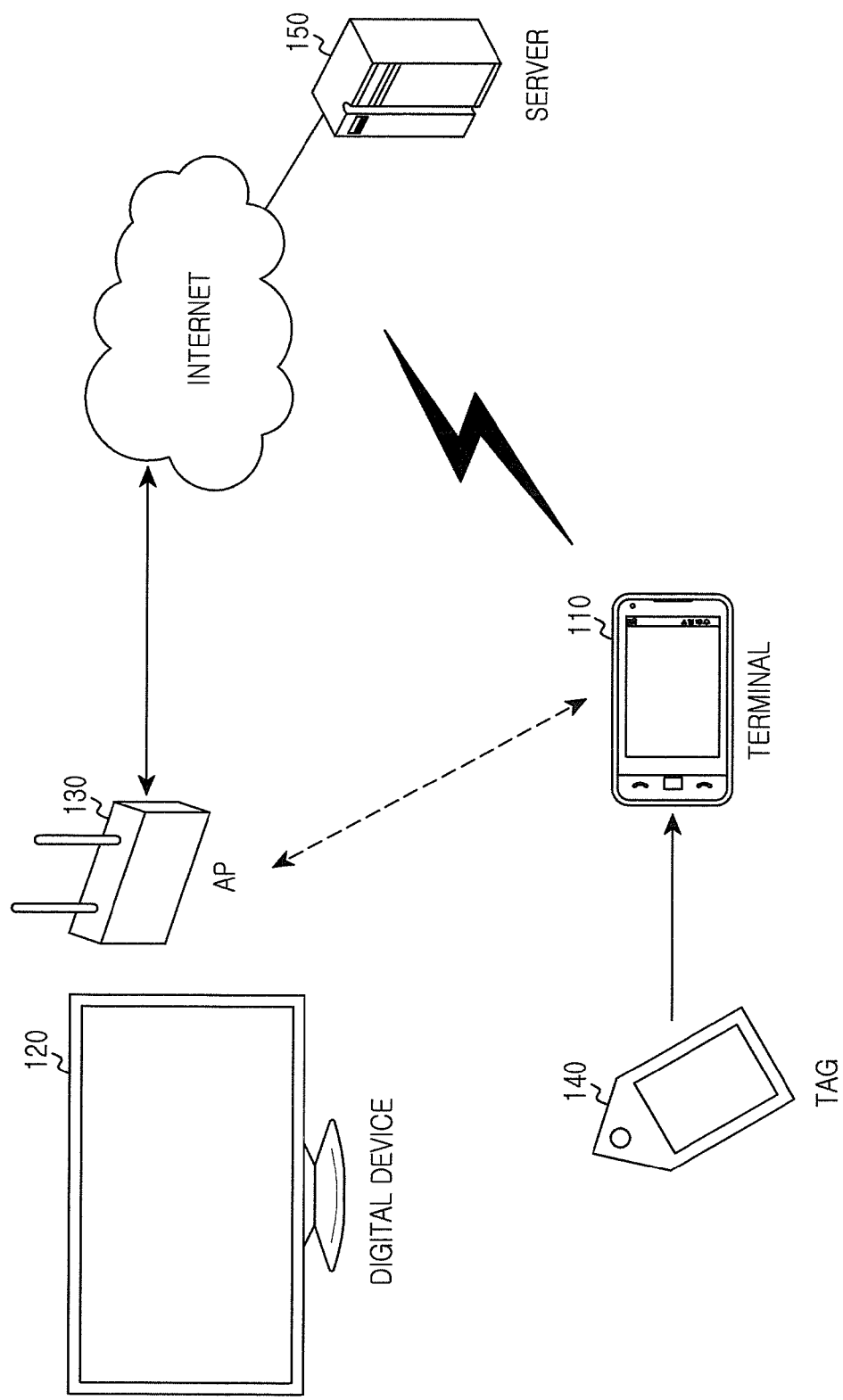
FIG. 1 illustrates an example simplified wireless network according to an embodiment of the present invention.

FIG. 1 illustrates an example simplified wireless network according to an embodiment of the present invention.

Referring to FIG. 1, the wireless network includes a terminal 110, a digital device 120, an AP 130, a tag 140, and a server 150.

The terminal 110 may be referred to as user equipment and includes an interface for accessing the AP 130 and an interface for accessing a network, such as the Internet, via a mobile communication system such as cellular network. The terminal 110 includes a module configured to read and write information from and to the tag 140 using Radio Frequency IDentifier (RFID) technology.

The digital device 140 includes equipment for consuming or generating media content such as multimedia, video, and audio. While the digital device 120 is a TV as shown in FIG. 1, the digital device 120 can employ any device such as PC and audio player in addition to the TV. The digital device 120 includes the AP 130 or is separate from and in communication with the AP 130. The AP 130 can be included or installed within or outside the digital device 120. Accordingly, the digital device 120 can access the network via the AP 130, and build a wireless network with an adjacent device, for example, with the terminal 110 via the AP 130.

The tag 140 includes an RFID tag, and stores authentication information of the digital device 120. The tag 140 can provide the stored information to an RFID reader and store information received from an RFID writer according to the RFID technology. For example, the RFID technology can be Near Field Communication (NFC). The housing of the tag 140 can be any suitable type. For example, the tag 140 can be provided in a form of a card, a remote controller of the digital device 120, a sticker, and so on. In one embodiment, the tag 140 can be attached to the digital device 120.

The server 150 provides the terminal 110 with information needed to access the AP 130. For example, the information needed to access the AP 130 can include a Service Set IDentifier (SSID), a password, and an encryption scheme of the AP 130. The server 150 is accessible over the network. Hence, the terminal 110 can access the server 150 via the mobile communication system, and the digital device 120 can access the server 150 via the AP 130.

The digital device 120 provides the server 150 with the information needed to access the AP 130 via the AP 130. The terminal 110 obtains the authentication information of the digital device 120 from the tag 140, accesses the server 150 through the mobile communication system, and then obtains the information needed to access the AP 130 using the authentication information. In doing so, a user merely associates the terminal 110 to the tag 140, and acquisition of the authentication information, server access, and acquisition of the information needed for the access configuration may be performed without the user's intervention. Herein, the access configuration without the user's intervention is referred to as auto configuration or auto access configuration.

In addition, after obtaining the information needed to access the AP 130, when the terminal 110 is re-associated with the tag, 140, the terminal 110 can record the information needed to access the AP 130 with the tag 140. The associating for the recording and the associating for the reading can be distinguished in different ways. For example, the associating for the recording and the associating for the reading can be distinguished based on a contact time. After recording the information, when the user contacts the terminal 110 associated with the tag 140 to configure the access again, the terminal 110 may use the information recorded to the tag 140 without re-accessing the server 150. Yet, when the information recorded to the tag 140 is not valid because, for example, changed setup information of the AP 130, the terminal 110 needs to acquire the updated information from the server 150.

Figure 2:
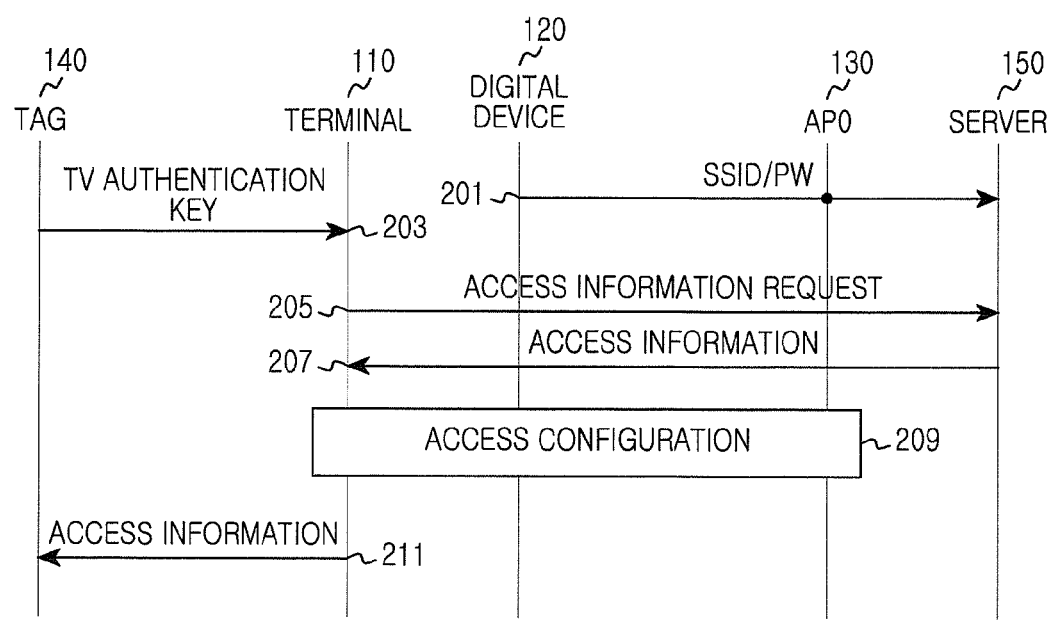
FIG. 2 illustrates an example access configuration in the wireless network according to an embodiment of the present invention.

FIG. 2 illustrates an example signal sequence diagram of the access configuration in the wireless network according to an embodiment of the present invention.

Referring to FIG. 2, in step 201, the digital device 120 transmits its authentication information and other information needed to access the AP 130 to the server 150 via the AP 130. The information needed to access the AP 130 can be stored when the digital device 120 is manufactured, or previously set by the digital device 120. Accordingly, the information needed to access the AP 130 is registered to the server 150 and identified by the authentication information of the digital device 120. Although not illustrated in FIG. 2, when the information needed to access the AP 130 has changed, the digital device 120 can re-register the information needed to access the AP 130.

In step 203, the terminal 110 obtains the authentication information of the digital device 120 from the tag 140. The terminal 110 can read the information from the tag 140 by associating the terminal 110 with the tag 140. As the authentication information of the digital device 120 is read from the tag 140 through the association, the next auto configuration is performed without user's intervention.

In step 205, the terminal 110 accesses the network over the mobile communication system and then transmits an access information request to the server. Herein, the access information includes the information needed to access the AP 130, and includes at least one of the SSID, the password, and the encryption scheme. The access information request includes the authentication information of the digital device 120 acquired from the tag 140. That is, the terminal 110 transmits the access information request including the authentication information to the server 150.

In step 207, the server 150 receiving the access information request transmits the access information to the terminal 110. More specifically, the server 150 determines whether the authentication information of the access information request is registered, and transmits the access information corresponding to the registered authentication information to the terminal 110. The server 150 can manage access information of a plurality of APs including the AP 130 using a DataBase (DB).

In step 209, the terminal 110 receiving the access information configures the access with the AP 130. In more detail, the terminal 110 activates a wireless Local Area Network (LAN) function and searches for the AP 130 having the SSID received from the server 150. Upon detecting the AP 130, the terminal 110 attempts the access. When the AP 130 requests the password, the terminal 110 attempts again to access by adding the password. In addition, the terminal 110 can further configure a communication channel with the digital device 120 via the AP 130.

In step 211, the terminal 110 records the access information received from the server 150 in the tag 140. The access information is recorded by associating the terminal 110 with the tag 140. The association for the reading in step 203 and the association for the writing in step 211 are distinguished based on the contact time. Still, when the user does not associate the terminal 110 with the tag 140, step 211 can be omitted.

In FIG. 2, the tag 140 does not store the access information of the AP 130. Alternatively, after the access information is recorded in the tag 140, step 203 can be performed. In this case, since the terminal 110 obtains the access information from the tag 140, steps 205 and 207 can be omitted. Yet, when the access information of the AP 130 has changed and the access information obtained from the tag 140 is not valid, the terminal 110 fails the access trial. When the access trial fails, the terminal 110 acquires the updated access information in steps 205 and 207.

When the access configuration is completed as shown in FIG. 2, the terminal 110 and the digital device 120 can share media content through the configured connection. The media content can be shared according to various protocols. For example, the protocol for the content sharing can adopt Digital Living Network Alliance (DLNA). The media content can be shared in various ways. For example, the media content selected by the user through the terminal 110 can be played at the digital device 120, the media content played in the terminal 110 can be played identically in the digital device, or a display screen of the terminal 110 can be displayed identically in the digital device 120. The media content sharing is now described in FIG. 3.

Figure 3:
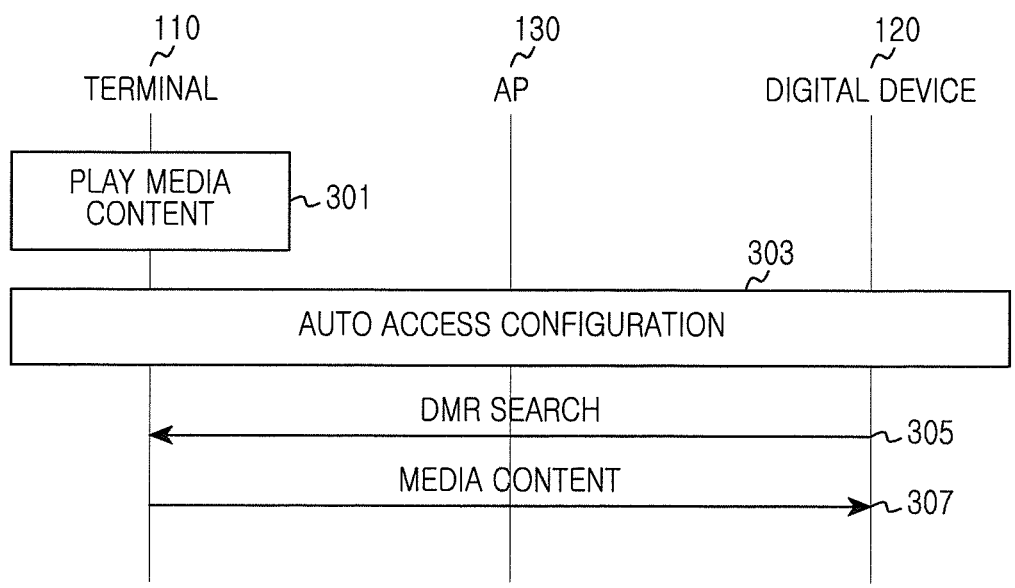
FIG. 3 illustrates example media content sharing in the wireless network according to an embodiment of the present invention.

FIG. 3 illustrates an example signal sequence diagram of media content sharing in the wireless network according to an embodiment of the present invention.

Referring to FIG. 3, in step 301, the terminal 110 plays the media content according to user's manipulation. In step 303, the terminal 110 performs the auto access configuration of the present invention. The auto access configuration can be performed as shown in FIG. 2. That is, the terminal 110 reads the authentication information of the digital device 120 from the tag 140 according to the user's association, obtains the access information using, the authentication information, and then accesses the AP 130. Alternatively, step 303 can precede step 301.

In step 305, the terminal 110 completing the auto access configuration drives the DLNA and searches for a device capable of playing the media content over the network. According to the DLNA protocol, an object for holding and providing the media content is referred to as a Digital Media Controller (DMC) and an object for playing the media content is referred to as a Digital Media Renderer (DMR). In this case, the terminal 110 is the DMC and the DMR, and the digital device 120 is the DMR. The terminal 110 can identify at least one DLNA object in the network and generate a list of the at least one DLNA object. Thus, the terminal 110 identifies the digital device 120 as the DMR.

In step 307, the terminal 110 identifying the digital device 120 as the DMR pushes the played media content to the digital device 120. That is, the terminal 110 confirms that the DMR identified in step 305 is the digital device 120 connected through the auto access configuration of step 303, and transmits the media content to the digital device 120. At this time, the media content can be shared according to a user's command or without the user's intervention.

Now, operations and structures of the terminal, the digital device, and the server for configuring, the access and sharing the media content as stated above are explained in detail by referring to the drawings.

Figure 4:
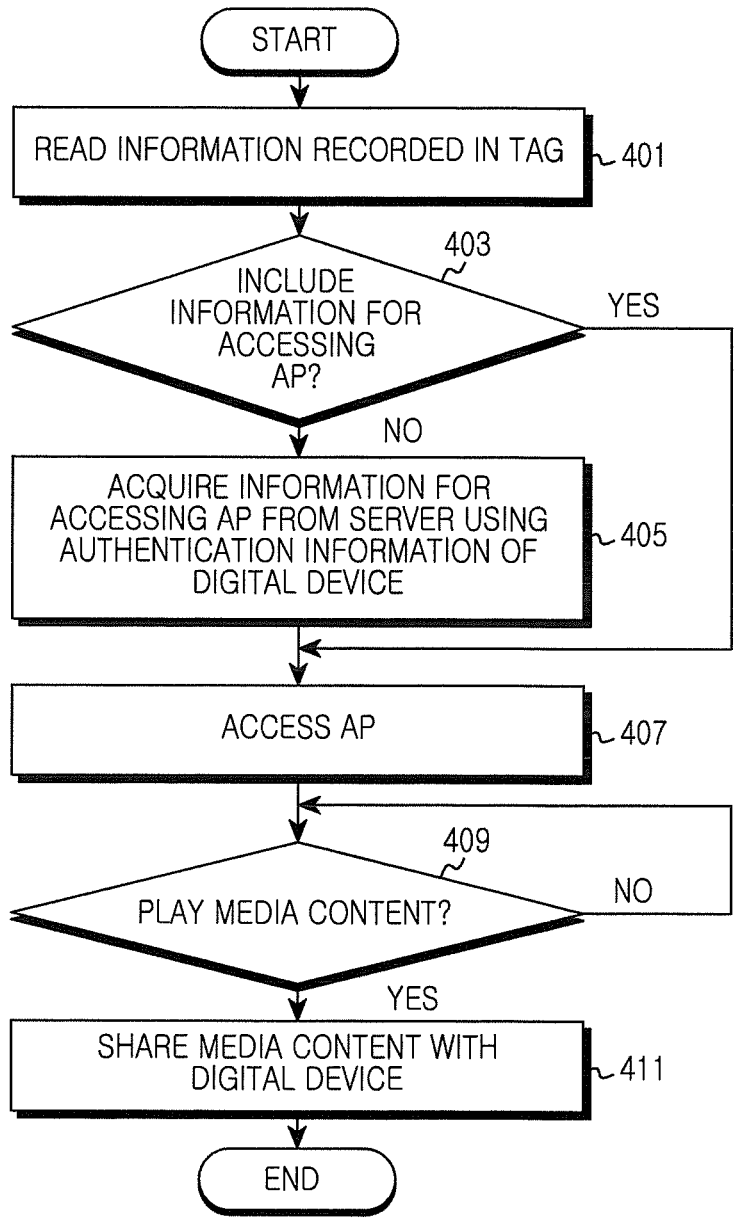
FIG. 4 illustrates example operations of a terminal in the wireless network according to an embodiment of the present invention.

FIG. 4 illustrates example operations of the terminal in the wireless network according to an embodiment of the present invention.

In step 401, the terminal reads the information recorded in the tag. The tag can provide the stored information to the RFID reader and store the information provided from the RFID writer according to the RFID technology. That is, the terminal includes an RFID reader and can read the information recorded in the tag by associating with the tag. Herein, the information recorded in the tag includes the authentication information of the digital device. In addition, the information recorded in the tag can further include the information needed to access the AP connected to the digital device.

In step 403, the terminal determines whether the information recorded in the tag includes the information needed to access the AP. For example, the information needed to access the AP can include at least one of the SSID, the password, and the encryption scheme of the AP. The information recorded in the tag includes the information needed to access the AP when the terminal records the information needed to access the AP with the tag before this process. When the information recorded in the tag includes the information needed to access the AP, the terminal skips step 405 and proceeds to step 407.

By contrast, when the information recorded in the tag does not include the information needed to access the AP, the terminal obtains the information needed to access the AP from the server using the authentication information of the digital device read from the tag in step 405. In detail, the terminal accesses the network through the mobile communication system. The terminal sends the access information request including the authentication information to the server, and receives the information needed to access the AP from the server.

In step 407, the terminal performs the access procedure with the AP using the information obtained from the tag, or the server. More specifically, the terminal activates the wireless LAN function and searches for the AP having the SSID of the obtained information. Upon detecting the AP, the terminal tries the access. When the AP requests the password, the terminal re-tries the access by adding the password. When the access fails because of the invalid SSID and password, the terminal re-obtains the information needed to access the AP from the server and then re-tries the access. In addition, the terminal can further establish the communication channel with the digital device vie the AP, which is not depicted in FIG. 4.

In step 409, the terminal determines whether the media content is played. Herein, the media content may be played before or after the access procedure.

When the media content is played, the terminal shares the media content with the digital device in step 411. The media content can be shared according to various protocols. For example, the protocol for the media content sharing can adopt the DLNA. When adopting the DLNA, the terminal drives the DLNA and searches for a device capable of playing the media content in the network. Hence, the terminal identifies the digital device as the DMR and pushes the media content to the digital device.

In FIG. 4, steps 409 and 411 are performed without the user's intervention. Alternatively, steps 409 and 411 can be conducted according to the user's selection or command. In this case, before or after step 409, the terminal can check whether the user's sharing command takes place. When the sharing command occurs, the terminal can perform step 411.

After the terminal obtains the information needed to access the AP from the server in step 405 and is associated with the tag, the terminal records the information needed to access the AP in the tag, which is not depicted in FIG. 4.

Figure 5:
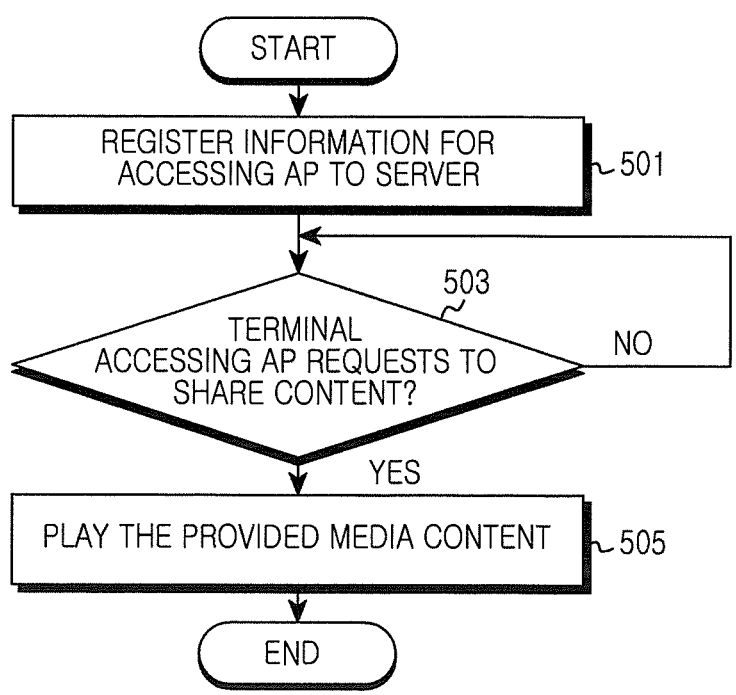
FIG. 5 illustrates example operations of a digital device in the wireless network according to an embodiment of the present invention.

FIG. 5 illustrates example operations of the digital device in the wireless network according to an embodiment of the present invention.

In step 501, the digital device registers the information needed to access the AP to the server. The digital device can be connected to the network via the internal or external AP. Hence, after connecting to the network via the AP, the digital device accesses the server and transmits the authentication information of the digital device and the information needed to access the AP to the server. The information needed to access the AP can include at least one of the SSID, the password, and the encryption scheme. Although not depicted in FIG. 5, when the information needed to access the AP has changed, the digital device can re-register the changed information with the server.

In step 503, the digital device determines whether the media content sharing is requested from the terminal accessing the AP. The media content can be shared according to various protocols. For example, the protocol for the media content sharing can adopt the DLNA. When adopting the DLNA, the digital device provides the information of the digital device as the DMR, in response to the search of the terminal.

When the media content sharing is requested, the digital device plays the media content provided from the terminal in step 505. That is, after the digital device provides the information of the digital device as the DMR in response to the search of the terminal, when the terminal pushes the media content, the digital device plays the media content.

Figure 6:
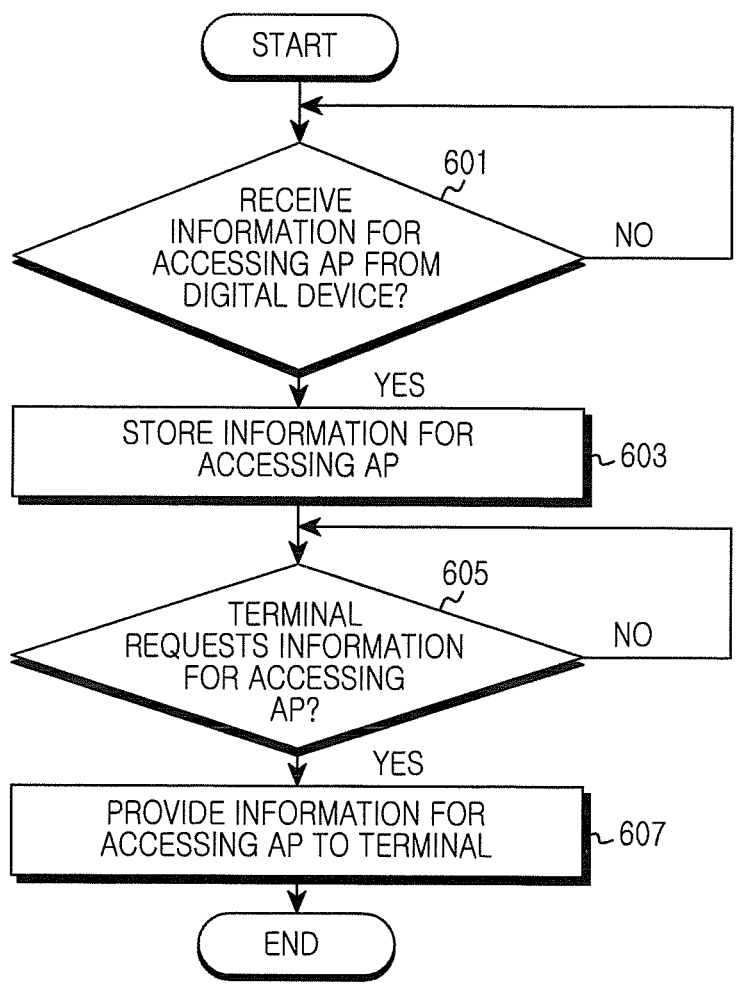
FIG. 6 illustrates example operations of a server in the wireless network according to an embodiment of the present invention.

FIG. 6 illustrates example operations of the server in the wireless network according to an embodiment of the present invention.

In step 601, the server determines whether the information needed to access the AP is received from the digital device. The server is accessible over the network. The AP can be provided inside or outside the digital device. At this time, the authentication information of the digital device is received together with the information needed to access the AP.

Upon receiving the information needed to access the AP from the digital device, the server stores the information needed to access the AP in step 603. Thus, the information needed to access the AP is registered with the server and identified by the authentication information of the digital device. The server can manage the access information of APs including the AP using the DB. When receiving the information from the digital device having the same authentication information as the pre-registered authentication information, the server updates the information needed to access the AP corresponding to the pre-registered authentication information.

In step 605, the server determines whether the terminal requests the information needed to access the AP. That is, the server determines whether an access information request for the AP is received from the terminal. Herein, the access information request includes authentication information of a particular digital device.

When the information needed to access the AP is requested, the server provides the information needed to access the AP to the terminal in step 607. In detail, the server determines whether the authentication information of the access information request is registered, and transmits access information corresponding to the registered authentication information to the terminal.

Figure 7:
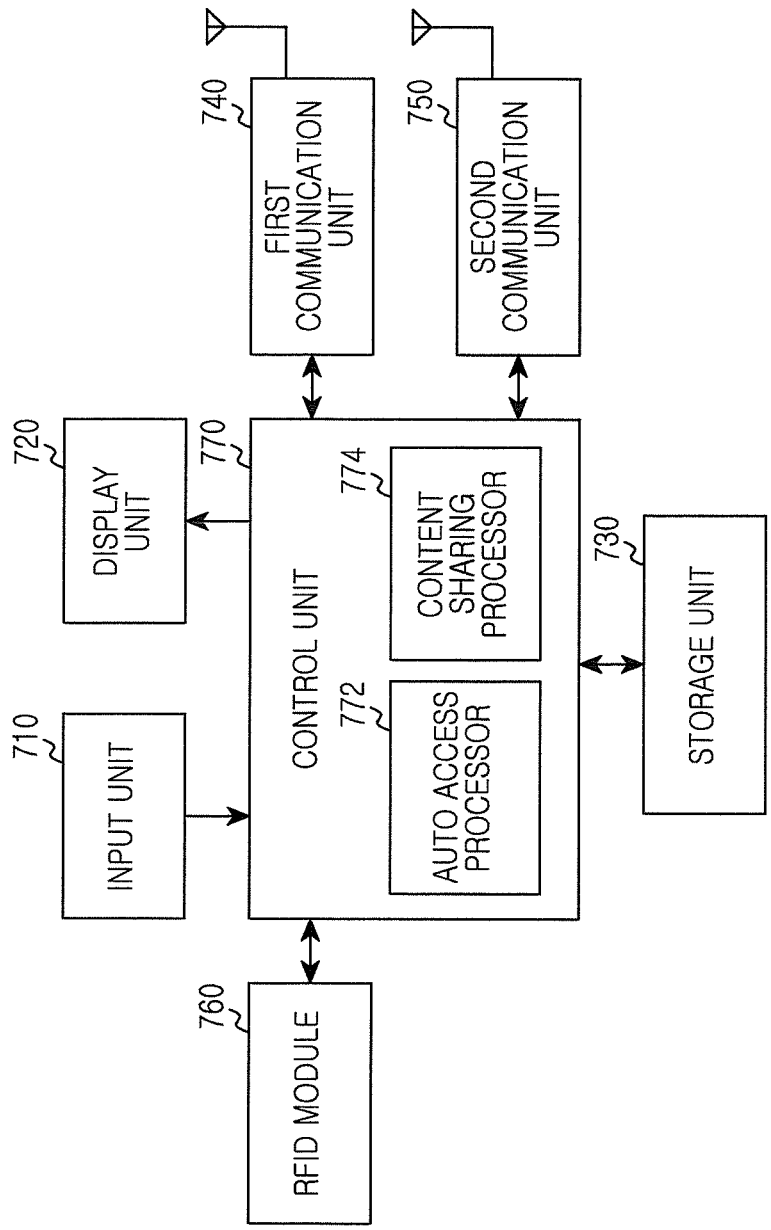
FIG. 7 illustrates an example terminal in the wireless network according to an embodiment of the present invention.

FIG. 7 illustrates an example terminal in the wireless network according to an embodiment of the present invention.

As shown in FIG. 7, the terminal includes an input unit 710, a display unit 720, a storage unit 730, a first communication unit 740, a second communication unit 750, an RFID module 760, and a control unit 770.

The input unit 710 receives input generated by the user and provides the control unit 770 with information corresponding to the input. The input unit 710 may include, for example, a keyboard, a keypad, a touch screen, a touch pad, a mouse, and a special function button. The display unit 720 displays state information during the operation of the terminal, and numbers, characters, and images according to an application execution. That is, the display unit 720 visually represents image data provided from the control unit 770. For example, the display unit 720 can employ a Liquid Crystal Display (LCD), an Organic Light-Emitting Diode (OLED), and so on. The storage unit 730 stores an executable program for operating the portable terminal, an application program, and data such as user media content. The storage unit 730 provides the stored data according to a request of the control unit 770.

The first communication unit 740 provides an interface for accessing the mobile communication system. The first communication unit 740 converts data and Radio Frequency (RF) signals according to the standard of the mobile communication system. The second communication unit 750 provides an interface for accessing the wireless LAN. That is, the second communication unit 750 converts data and RF signals according to the wireless LAN standard. The RFID module 760 performs at least one of a function for reading information stored to the RFID tag and a function for recording information in the RFID tag. For example, when the terminal including the RFID module 760 is associated to the RFID tag, the RFID module 760 reads the information stored in the RFID tag and provides the information to the control unit 770. For example, when the terminal including the RFID module 760 is associated with the RFID tag, the RFID module 760 records the information provided from the control unit 770, to the RFID tag.

The control unit 770 controls the functions of the terminal. In particular, the control unit 770 includes an auto access processor 772 for the auto access configuration, and a content sharing processor 774 for sharing the media content with the digital device in the wireless network configured through the auto access configuration.

For the auto access configuration, the control unit 770 operates as follows. The control unit 770 reads the information recorded in the tag through the RFID module 760. The information recorded in the tag includes the authentication information of the digital device, and can further include the information needed to access the AP connected with the digital device. When the information recorded in the tag includes the information needed to access the AP, the control unit 770 performs the access procedure with the AP using the obtained information. By contrast, when the information recorded in the tag does not include the information needed to access the AP, the control unit 770 accesses the server through the first communication unit 740, acquires the information needed to access the AP from the server using the authentication information of the digital device read from the tag, and then performs the access procedure with the AP. In so doing, the control unit 770 can further build the communication channel with the digital device via the AP. In addition, after the information needed to access the AP is obtained, when the terminal is associated with the tag, the control unit 770 records the information needed to access the AP to the tag through the RFID tag 760.

To share the media content, the control unit 770 operates as follows. After the auto access configuration is completed, when the media content is played, the control unit 770 shares the media content with the digital device. The media content can be shared according to various protocols. For example, the protocol for the media content sharing can adopt the DLNA. When adopting the DLNA, the control unit 770 drives the DLNA and searches for the device capable of playing the media content in the network. Hence, the control unit 770 identifies the digital device as the DMR and pushes the media content to the digital device. The media content sharing can be performed without the user's intervention. Alternatively, the media content can be shared according to the user's selection or command.

Figure 8:
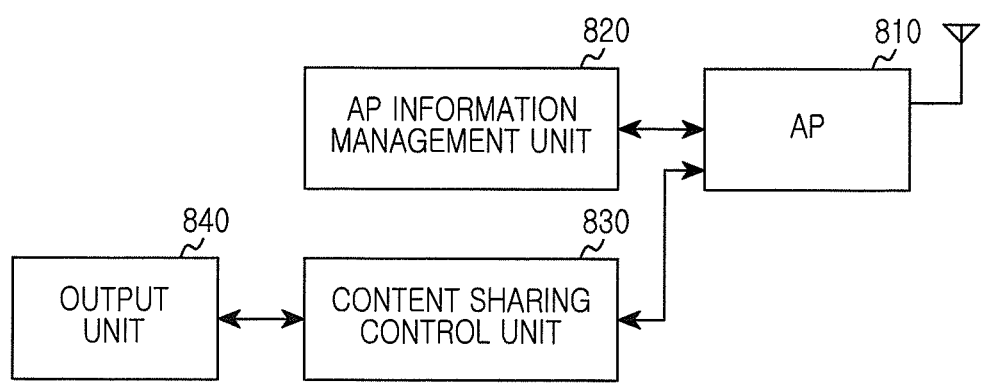
FIG. 8 illustrates an example digital device in the wireless network according to an embodiment of the present invention.

FIG. 8 illustrates an example digital device in the wireless network according to an embodiment of the present invention.

As shown in FIG. 8, the digital device includes an AP 810, an AP information management unit 820, a media content sharing control unit 830, and an output unit 840.

The AP 810 provides the wireless access for connecting to the Internet network. That is, the AP 810 has the wired connection to the network, and provides the wireless connection to at least one object in the wireless network. In FIG. 8, the AP 810 is part of the digital device. Alternatively, the AP 810 can be provided as a separate device.

The AP information management unit 820 manages the information needed to access the AP 810. That is, the AP information management unit 820 stores the information relating to the SSID, the password, and the encryption scheme of the AP 810. In particular, the AP information management unit 820 accesses the server and registers the information needed to access the AP 810 to the server. When registering the information needed to access the AP 810, the AP information management unit 820 also provides the authentication information of the digital device. The AP information management unit 820 can change the SSID and the password of the AP 810. For example, the SSID and the password can be changed by the user's command. When the SSID and the password are changed, the AP information management unit 820 updates the information needed to access the AP 810 registered to the server.

The content sharing control unit 830 shares the media content with the terminal accessing the AP 810. The media content can be shared according to various protocols. For example, the protocol for the media content sharing can adopt the DLNA. When adopting the DLNA, the content sharing control unit 830 provides the information of the digital device as the DMR in response to the terminal's search. When the terminal accessing the AP 810 requests to share the media content, the content sharing control unit 830 outputs the media content provided from the terminal to the output unit 840.

The output unit 840 outputs the media content. The output includes at least one of audio content, video content, and still imagery. That is, the output unit 840 can employ at least one of a speaker and a display means.

Although not depicted in FIG. 8, the digital device can further include an RFID module according to another embodiment. In this case, the digital device can record the information needed to access the AP 810 in the RFID tag which stores the authentication information of the digital device, rather than to the server.

Figure 9:
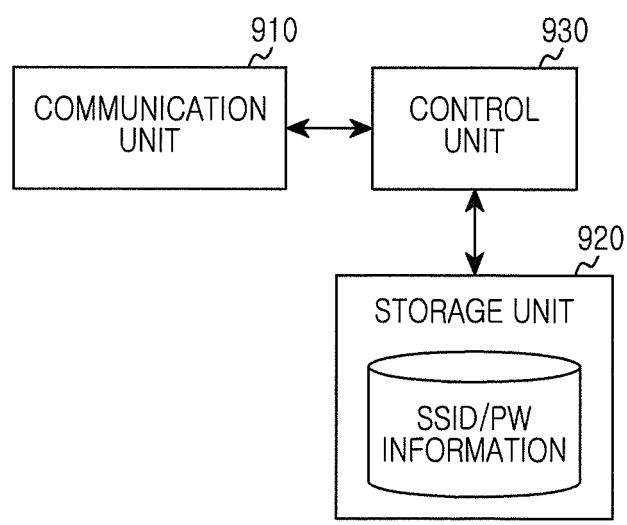
FIG. 9 illustrates an example server in the wireless network according to an embodiment of the present invention.

FIG. 9 illustrates an example server in the wireless network according to an embodiment of the present invention.

Referring to FIG. 9, the server includes a communication unit 910, a storage unit 920, and a control unit 930.

The communication unit 910 provides an interface for transmitting and receiving information over the Internet network. The communication unit 910 can be referred to as a network card, an Ethernet card, an Ethernet adaptor, a Network Interface Card (NIC), and the like.

The storage unit 920 stores an operating program to operate the server, setup information, and service related data provided from the server. In particular, the storage unit 920 stores the information needed to access at least one AP connected to the digital device. The information needed to access the AP includes at least one of the SSID, the password (PW), and the encryption scheme. The information needed to access the AP can be identified by the authentication information of the corresponding digital device.

The control unit 930 controls the functions of the server. In particular, the control unit 930 registers the information for accessing the AP provided from the digital device. That is, the control unit 930 stores the information for accessing the AP provided from the digital device, in the storage unit 920. When the terminal provides the authentication information of the digital device and requests the information for accessing the AP, the control unit 930 provides the information for accessing the AP stored in the storage unit 920.

As set forth above, by means of the RFID tag having the information of the digital device and the server having the access related information in the wireless network, the access configuration procedure of the user is simplified as the single operation to thus provide relatively good convenience for the user.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of operating a terminal for configuring access to a wireless network, the method comprising:
    reading information from a remote controller having a Radio Frequency IDentifier (RFID) tag, by tagging to the remote controller;
    determining whether the read information is access configuration information for accessing a digital device through an access point (AP) which is included in the digital device or authentication information of the digital device;
    if the read information is the authentication information, transmitting the authentication information to a server;
    receiving access configuration information for accessing the digital device through the AP that is included in the digital device, from the server;
    communicating the digital device through the AP using the received access configuration information; and
    if the read information is access configuration information, communicating the digital device through the AP using the access configuration information read from the remote controller.

2. The method of claim 1, further comprising:
    sharing a media content which is being played by the terminal with the digital device.

3. The method of claim 2, wherein sharing the media content comprises,
    searching for at least one sharing object in a network;
    determining whether the at least one sharing object comprises the digital device; and
    pushing the media content to the digital device when the at least one sharing object comprises the digital device.

4. The method of claim 1, further comprising:
    recording the access configuration information to the RFID tag.

5. The method of claim 1, wherein the access configuration information comprises at least one of a Service Set IDentifier (SSID), a password, and an encryption scheme for the AP.

6. The method of claim 1, wherein the RFID tag comprises a Near Field Communication (NFC) tag.

7. A method of operating a digital device and a remote controller having a Radio Frequency IDentifier (RFID) tag recorded authentication information of the digital device in a wireless network, the method comprising:
    accessing, by the digital device, a server via an Access Point (AP) that is included in the digital device;
    registering, by the digital device, authentication information of the digital device and access configuration information to access the AP to the server; and
    communicating, by the digital device, with a terminal via the AP using the access configuration information,
    wherein the access configuration information is recorded in the RFID tag of the remote controller by the terminal, instead of recording the authentication information after the communication.

8. The method of claim 7, further comprising:
    when the access configuration information has changed, re-registering the changed access configuration information to the server.

9. The method of claim 7, further comprising:
    receiving a media content from the terminal accessing the AP; and
    playing the media content.

10. An apparatus of a terminal configured to access wireless network, the apparatus comprising:
    a RFID module configured to comprise a reader to read information from a remote controller having a Radio Frequency IDentifier (RFID) tag, by tagging to the remote controller and a writer to record information;
    a communication unit; and
    a controller configured to:
        determine whether the read information is access configuration information for accessing a digital device through an access point (AP) which is included in the digital device or authentication information of the digital device,
        if the read information is the authentication information, transmit the authentication information to a server via the communication unit, receive access configuration information for accessing the digital device through the AP, which is included in the digital device, from the server, communicating the digital device through the AP using the received access configuration information, and if the read information is access configuration information, communicate the digital device through the AP using the access configuration information read from the remote controller.

11. The apparatus of claim 10, wherein the controller is configured to share a media content which is being played by the terminal with the digital device.

12. The apparatus of claim 11, wherein the controller is configured to search for at least one sharing object in a network, determine whether the at least one sharing object comprises the digital device, and push the media content to the digital device.

13. The apparatus of claim 10, wherein the controller is configured to record the access configuration information to the RFID tag through the RFID module.

14. The apparatus of claim 10, wherein the access configuration information comprises at least one of a Service Set IDentifier (SSID), a password, and an encryption scheme for the AP.

15. The apparatus of claim 10, wherein the RFID tag comprises a Near Field Communication (NFC) tag.

16. A system including a digital device and a remote controller configurable in a wireless network, the system comprising:
 the remote controller comprising:
  a Radio Frequency IDentifier (RFID) tag configured to record authentication information of the digital device, and
 the digital device comprising:
  an Access Point (AP); and
  a controller configured to:
   access a server via the AP,
   register authentication information of the digital device and access configuration information to the server; and
   communicate with a terminal via the AP using the access configuration information,
  wherein the access configuration information is recorded in the RFID tag of the remote controller by the terminal, instead of recording the authentication information after the communication.

17. The system of claim 16, wherein, the controller is configured to re-register changed access configuration information to the server when the access configuration information is changed.

18. The system of claim 16, wherein the controller is configured to receive a media content from the terminal accessing the AP, and play the media content.

* * * * *